United States Patent
Palumbo et al.

(10) Patent No.: US 6,774,183 B1
(45) Date of Patent: Aug. 10, 2004

(54) COPOLYESTERS HAVING IMPROVED RETAINED ADHESION

(75) Inventors: Jeffrey T. Palumbo, Bedford, MA (US); Francis C. Rossitto, Danvers, MA (US); Eugene Gary Sommerfeld, Danvers, MA (US)

(73) Assignee: Bostik, Inc., Middleton, MA (US)

( * ) Notice: Subject to any disclaimer, the term of this patent is extended or adjusted under 35 U.S.C. 154(b) by 0 days.

(21) Appl. No.: 09/559,794

(22) Filed: Apr. 27, 2000

(51) Int. Cl.$^7$ ................ C09D 153/00; C09D 167/02; C09J 153/00; C09J 167/02
(52) U.S. Cl. ............ 525/176; 525/177; 525/438; 525/439; 525/440; 525/444; 525/446; 525/454; 525/474; 525/533; 528/26; 528/29
(58) Field of Search ............... 525/176, 177, 525/438, 439, 440, 444, 446, 454, 466, 474, 533; 528/26, 29

(56) References Cited

U.S. PATENT DOCUMENTS

| | | | |
|---|---|---|---|
| 3,935,154 A | 1/1976 | Cawley | 260/33.8 SB |
| 4,207,230 A | 6/1980 | Bier et al. | 260/22 CB |
| 4,223,106 A | 9/1980 | Bier et al. | 525/173 |
| 4,348,510 A | 9/1982 | Keck et al. | 528/26 |
| 4,382,131 A | 5/1983 | Binsack et al. | 525/445 |
| 4,496,704 A | 1/1985 | Ginnings | 525/474 |
| 4,539,379 A * | 9/1985 | Hallgren | 525/446 |
| 4,608,421 A * | 8/1986 | Lin | 525/403 |
| 4,659,786 A | 4/1987 | Kawakami et al. | 525/415 |
| 4,686,262 A | 8/1987 | Binsack et al. | 525/445 |
| 4,826,946 A * | 5/1989 | Eichenauer | 528/14 |
| 4,845,158 A | 7/1989 | Peters | 525/146 |
| 4,927,895 A | 5/1990 | Nakane et al. | 528/26 |
| 4,945,147 A * | 7/1990 | Policastro | 528/26 |
| 4,994,526 A | 2/1991 | Peters | 525/167 |
| 5,773,517 A | 6/1998 | Masuda et al. | 525/90 |

FOREIGN PATENT DOCUMENTS

| | | |
|---|---|---|
| EP | 0 242 027 | 10/1987 |
| EP | 0242 027 B1 | 9/1994 |
| JP | 04299723 | 11/1992 |
| JP | 05013950 | 1/1993 |
| JP | 06067186 | 4/1994 |
| JP | 08042558 | 2/1996 |
| JP | 08330334 | 11/1996 |
| JP | 08344506 | 12/1996 |
| JP | 09040065 | 2/1997 |

\* cited by examiner

*Primary Examiner*—Patricia A. Short
(74) *Attorney, Agent, or Firm*—David G. Conlin; John B. Alexander; Edwards & Angell, LLP

(57) ABSTRACT

The present invention provides copolyester compositions and novel methods employing such compositions. The copolymer compositions comprise a copolyester containing a low polarity block in the copolyester backbone, thereby resulting in adhesive and coating materials that exhibit improved flow and wettablility and superior initial adhesion and retained adhesion to various substrates.

47 Claims, No Drawings

COPOLYESTERS HAVING IMPROVED RETAINED ADHESION

FIELD OF THE INVENTION

The present invention relates to novel copolyester compositions and novel methods employing such compositions. The copolyester compositions of the present invention contain a low polarity block segment in the polymer backbone. These copolyester compositions are particularly suitable for use as adhesive and coating materials and exhibit high initial adhesion and superior retained adhesion to various substrates.

BACKGROUND OF THE INVENTION

Many amorphous copolyester compositions are commonly used as adhesive and coating materials because of their useful properties, which include: strong cohesion when below their glass transition temperatures ("$T_g$"), strong adhesion and good clarity. Such compositions are also generally inexpensive. However, amorphous compositions are not suitable in a variety of adhesive and coating applications. For example, such compositions do not adequately adhere to substrates such as polypropylene, polyethylene, thermoplastic polyolefins ("TPO's") and various other low surface energy substrates. Additionally, the mechanical and adhesive properties of many amorphous adhesives and coatings are often inadequate for certain higher temperature applications above their $T_g$'s. They also possess limited tensile strength and hydrolytic stability above their $T_g$. Still further, these materials are generally limited in solvent and chemical resistance.

Crystalline copolyesters are generally superior to amorphous materials, especially when the materials are above their glass transition temperatures, in that they possess many valuable properties, including rigidity, hardness, toughness, tensile strength, abrasion resistance, solvent resistance, chemical resistance, good elevated temperature performance up to their crystalline melt point, good balance of flexibility and toughness, and better hydrolytic stability. However, the adhesion of crystalline polymers to a variety of substrates, such as polyethyleneterephthalate (PET), decreases rapidly over time as these polymers shrink during crystallization and subsequently pull away from the substrate to which they were adhered. Amorphous polymers do not suffer this same fate since shrinkage of these polymers is not significant enough to result in loss of adhesion as they age.

It would, thus, be desirable to provide improved copolyester adhesives and coatings that possess both the properties of amorphous polymers, namely retained adhesion over time ("aged adhesion"), and the properties of crystalline polymers, namely toughness and tensile strength over a broad temperature range, and superior solvent resistance and hydrolytic stability.

Crystalline copolyester compositions containing a low polarity block in the polymer backbone have been described in various patents. However, these compositions have been developed and used specifically for applications in which their low or anti-adhesion properties are required. Namely, these crystalline copolyester compositions were developed and used to specifically provide slip, for example, in mold forming materials for use in processes wherein the molded articles must be readily released from the mold's surface.

U.S. Pat. Nos. 4,348,510 and 4,496,704 describe copolyester compositions formed from: hydroxyl terminated polyalkyleneoxide (A) and polydimethylsiloxane (B), in ABA triblock segments copolymerized with polyester forming components. Films, tapes, sheeting and other extruded or molded articles prepared from these polysiloxane block copolyesters are shown to exhibit improved slip or non-blocking tendencies, i.e. reduced tendency to adhere to other materials, as evidenced by their reduced static and kinetic coefficients of friction.

U.S. Pat. No. 4,382,131 and U.S. Pat. No. 4,686,262 describe a polyolefin block copolyester used in producing moldings exhibiting extremely low deformation and distortion even when processed into thin articles, and at the same time, retain their crystallinity despite the addition of the low polarity segment in the copolyester composition. U.S. Pat. Nos. 4,207,230 and 4,223,106 also describe block copolyesters containing a low polarity polyolefin block segment that are used as molding materials with properties being similar to those described in U.S. Pat. No. 4,382,131.

U.S. Pat. No. 3,935,154 describes solvent soluble block copolyester, containing low polarity polysiloxane block segments, suitable for uses which require good release properties. Specifically, the compositions described are particularly useful in the photographic field as release agents for photoconductive materials.

U.S. Pat. No. 4,659,786 describes a polyester-polysiloxane block copolymer suitable for use as dental impression materials, as well as mold materials for general uses with good release properties. Sealing materials are also claimed.

U.S. Pat. No. 4,927,895 describes a polysiloxane block copolyester that exhibits good resistance to impact shock and to hydrolysis without any loss of the inherent advantageous properties, such as mechanical strength, of the base polyester resin.

U.S. Pat. Nos. 4,845,158 and 4,994,526 describe compositions used to prepare block resins which are molded into gaskets, washers, flexible tubing and similar articles.

U.S. Pat. No. 5,773,517 describes thermoplastic polyolefin block copolyesters that are used as polymer compatibilizers and quality improving agents. These block copolyesters are blended with and are used to improve various properties of other polymers, such as impact strength, tensile strength; elongation, heat resistance, paintability, weather resistance, elasticity, resilience, flowability, dimensional stability and chemical resistance.

It would thus be desirable to provide improved copolyester adhesive and coating materials that possess both advantageous properties of amorphous polymers, specifically improved and/or retained adhesion over time, and advantageous properties of crystalline polymers, especially superior hydrolytic stability, solvent resistance, chemical resistance, tensile strength and toughness over a broad temperature range.

SUMMARY OF THE INVENTION

It has now been discovered that copolyesters containing low polarity segments in their backbone possess unexpected properties that make them particularly useful as adhesive and coating materials.

The present invention provides high performance block copolyester compositions that are particularly suitable for use as adhesives and coatings because these materials incorporate the advantages of crystalline polymers while possessing the quality of retained or aged adhesion of amorphous polymers.

The compositions of the present invention comprise a copolyester having a low polarity block segment incorporated into the copolyester backbone. These compositions are superior in initial adhesion and aged adhesion, and they retain toughness and resistance to solvents while possessing improved wettability and hydrolytic stability over a broad temperature range.

The copolyesters of the present invention may be prepared by any conventional method. Preferably, the copolyesters are prepared by standard polycondensation processes utilizing difunctional alcohols and dicarboxylic acids and optionally up to about 3% of a polyfunctional branching agent. This synthesis normally occurs in two stages, with the first stage being a direct esterification or transesterification (alcoholysis) stage and the second stage being a polyesterification stage. See, e.g. V. V. Korshak and S. V. Vinogradova, *Polyesters*, Chapter III, pp. 72–150, Pergamon Press, N.Y., N.Y., (1965).

The low polarity block is incorporated into the backbone of the copolyester, preferably by its addition at the beginning of the direct esterification $1^{st}$ stage reaction along with the difunctional alcohols and dicarboxylic acids. The low polarity block may also be added at any time during the direct esterification stage, but preferably prior to the $2^{nd}$ stage (polyesterification).

Some examples of difunctional alcohols useful in the practice of the present invention include: alkyl diols from $C_2$ to $C_{12}$, such as ethylene glycol, diethylene glycol, butanediol, propanediol, hexanediol, and the like; cycloaliphatic diols, such as cyclohexanedimethanol and the like; aliphatic diols containing aromatic moieties; and polymeric and/or oligomeric alkyleneoxide polyols having an alkyl chain length of from $C_2$ to $C_{12}$ (linear or branched), preferably with the polyol having a number average molecular weight from about 300 to 8000, more preferably from about 1000 to about 5000, and most preferably between about 1000 and 3000. Particularly preferred difunctional alcohols are ethylene glycol and butanediol.

Some examples of difunctional carboxylic acids useful in the practice of the present invention include: aliphatic diacids from $C_4$ to $C_{36}$, such as adipic acid, azelaic acid, sebacic acid, and the dimer acids; cycloaliphatic diacids, such as cyclohexane dicarboxylic acid and the like; aromatic diacids, such as terephthalic acid, isophthalic acid, naphthalene dicarboxylic acid and the like; and the lower ($C_1$ to $C_6$) alkyl esters of said dicarboxylic acids. Particularly preferred difunctional carboxylic acids are terephthalic acid, sebacic acid and isophthalic acid.

Relatively small amounts of polyfunctional branching agents may be added in order to make the material more polyfunctional. The branching agents can be added at any time during the direct esterification stage. Examples of polyfunctional branching agents useful in the practice of the present invention may include those conventionally used, such as: trimellitic anhydride, pyromellitic dianhydride, trimethylolethane, trimethylolpropane and pentaerythritol.

Examples of low polarity block segments useful in the practice of the present invention include: saturated and unsaturated telechelic polyolefins comprised of monomeric units, from $C_2$ to $C_{18}$, and possessing functional end-groups, such as hydroxyl, carboxyl, anhydride, acid chloride, oxirane and the like, preferably having a weight average molecular weight from about 500 to 4500, more preferably about 1000 to about 4000, and most preferably about 1800 to about 3500; ABA block copolymers with a weight average molecular weight from about 500 to 10,000, preferably about 1500 to about 6000, more preferably about 1800 to about 3500, wherein B is an alkyl and/or aromatic substituted polysiloxane, and where A is a functionally terminated polyalkyleneoxide with an alkyl chain length of $C_2$ to $C_6$; and fluorine substituted telechelic oligomers and polymers, such as polyesters, acrylics, polyurethanes, polyolefins, polycarbonates, epoxies (e.g., epichlorohydrin-bis-phenol and Novolac® type polymers), and the like. The above-mentioned polyolefins may include a variety of monomers, for example: ethylene, propylene, butylene, isobutylene, other alkyl substituted olefins, α-olefins, butadiene, and/or copolymers thereof. One preferred polyolefin material is Kraton L-2203 (Shell), which is a hydroxyl-terminated butylene/ethylene copolymer comprising about 50% by weight of butylene and about 50% by weight of ethylene, and having an average MW of about 3,000. One preferred hydroxyl terminated ABA polysiloxane triblock material is CoatOSil 2812 (Witco), which comprises about 40% by weight of polyalkyleneoxide (A) and about 60% by weight of polydimethylsiloxane (B). More specifically, the CoatO-Sil 2812 comprises about 40% by weight of a 350 molecular weight polypropyleneoxide/ethyleneoxide tipped block (A) and about 60% by weight of a 2000 molecular weight polymethylsiloxane block (B).

Thus, a particularly preferred polycondensation reaction involves a reaction of (1) ethylene glycol and/or butanediol, (2) terephthalic acid and/or sebacic acid and/or isophthalic acid and (3) Kraton -2203 and/or CoatOSil 2812. Optionally, one or more of the polyfunctional branching agents listed above may be added, as discussed above.

The thus formed copolyesters of the present invention, having the incorporated low polarity block, preferably have a weight average molecular weight of from about 5,000 to about 150,000. More preferably, the copolyesters, having the incorporated low polarity block, have a weight average molecular weight of from about 10,000 to about 100,000. Most preferably, the copolyesters have a weight average molecular weight of from about 30,000 to about 90,000. The low polarity block is preferably incorporated into the backbone of the copolyesters at levels of from about 0.5 to about 85 weight percent, more preferably from about 1 to about 50 weight percent, and most preferably from about 2 to about 35 weight percent.

The copolymer compositions of the present invention are particularly useful as adhesives and coatings in a variety of applications, and for a wide variety of substrates, either alone, or used as modifiers with other polymers which have not themselves been modified with a low polarity material. For example, some materials to which the compositions of the present invention exhibit unique adhesive properties include materials such as: untreated polyethyleneterephthalate (PET), polyethylenenaphthalate (PEN), untreated oriented polypropylene (OPP), polyvinyl fluoride (Tedlar®), nylon, polyimide, polycarbonate, polystyrene, polymethyl methacrylate (PMMA), polyvinyldiene fluoride (Kynar®), polyurethanes, and cellulosics.

The copolymer compositions of the present invention may further be used as a tie-layer functioning as an adhesive for the purpose of bonding polymer materials with dissimilar surface energies during coextrusion production of composite films. Substrates such as: PET, PEN, polyolefins, vinyl-type-polymers (Tedlar®, Kynar®, PVC), and the like may be utilized in such procedures.

The copolymer compositions of the present invention are also useful as a coated adhesive sheath on a fiber core. As such, the copolymer compositions are coated on the surface of a fiber (core), preferably by extrusion, and utilized as a sheath adhesive. The adhesive sheath may be reactivated with heat and the intersecting fibers fused.

The copolymer compositions of the present invention are also useful as powder adhesives. In such applications, the copolymer compositions are ground to a desired particle size distribution and applied to a carded mat of fibers, which is then compressed and fused to produce non-woven fabrics. These block copolyesters can also be applied to fabrics and used to bond these fabrics to themselves or other substrates. Similarly, the powdered copolymer compositions can be used as adhesives or coatings on films or foils, in a wide variety of applications. For example, such powdered adhesives can be used to adhere cloth, plastic film, or composite materials to foams, e.g. form seating materials, for automotive interior trim applications.

The copolymer compositions may also be used as web or film adhesives. As a web adhesive, the fast-crystallizing, thermoplastic polymers of the present invention are melt extruded into a "web-like", fibrous material. This fibrous material may then be applied to fabrics, foams, films, etc. and heat activated to form an adhesive bond which exhibits improved retained adhesion to these materials.

Still further, essentially any utility for an adhesive or coating can obtain improved adhesion by inclusion of the low polarity/copolyester materials of the present invention, either as adhesive or coating material per se, or as an adhesion promoter, added to other adhesive or coating materials. The copolymer compositions can be hot-melt or solvent applied, used alone, or in conjunction with curing or thermosetting components. Suitable curable components include aminoplasts, phenoplasts, epoxy resins, polyisocyanates, silanes, aziridines and the like.

Thus compositions of the present inventions can be applied in a variety of forms for a wide variety of adhesive and coating applications, and provide the ability to obtain the unexpected performance advantages in such applications.

DETAILED DESCRIPTION OF THE INVENTION

The compositions of the present invention comprise a copolymer, namely a copolyester, having a low polarity block segment incorporated into the backbone of the copolymer. Such compositions possess unexpected properties including superior initial and retained ("aged") adhesion. The compositions also provide unexpected improvements in retained toughness, solvent resistance, wettability, and hydrolytic stability. These compositions are particularly suitable for use as adhesive and coating materials.

The copolyesters may be prepared by any of the conventional methods, such as, for example, by a standard polycondensation reaction of difunctional alcohols and dicarboxylic acids and optionally up to about 3% of a polyfunctional branching agent. This synthesis normally occurs in two stages. In the first, or direct esterification stage, the hydroxyl and carboxyl containing monomers are reacted to form low molecular weight glycolate oligomers accompanied by the liberation of water. If methyl esters of carboxyl containing monomers are used, this stage is referred to as the transesterification (alcoholysis) state and is accompanied by the liberation of methanol instead of water. In the second, or polyesterification stage, higher molecular weight polymers are obtained by further reaction under vacuum of these low molecular weight oligomers via (1) ester-ester interchange, (2) alcoholysis and (3) acidolysis.

The first stage of this process may proceed with or without the use of a catalyst, since the acid monomers utilized in the esterification process are self-catalyzing. However, the reaction time may be reduced by introduction of an esterification catalyst. For example, some typical direct esterification stage catalysts include acid salts, hydroxides of potassium and lithium, para-toluenesulfonic acid (p-TSA), lead and tin salts, and mineral acids such as sulfuric and hydrochloric acid. Some typical transesterification (alcoholysis) stage catalysts include alkyl titanates, alkyl tin compounds and the acetates of antimony, zinc, manganese, magnesium and calcium.

The second stage of this process (polyesterification) is, in general, extremely sluggish, and will not proceed to high molecular weights without the aid of a catalyst. Thus, typically, second stage catalysts are added, such as oxides of lead, manganese and germanium, alkyl titanates (e.g. Tyzor TBT and Tyzor TOT), alkanolamine complexes of titanium (Tyzor DEA) and organotin compounds (e.g. Fascat 9100, 9200, 9201).

The low polarity block segment is preferably incorporated into the backbone of the copolyester by adding a low polarity reactive difunctional oligomeric material to the reaction at the beginning of the direct esterification stage. Alternatively, the low polarity difunctional reactive oligomeric block material may be added during the direct esterification reaction, but prior to the polyesterification (vacuum) stage of the reaction.

Difunctional alcohols useful in the practice of the present invention generally have the following formula shown in Formula 1:

HO—R—OH                                                 Formula 1 wherein R is an aliphatic moiety containing from 2 to 12 carbon atoms and/or a cycloaliphatic moiety containing from 6 to 12 carbon atoms.

For example, some difunctional alcohols useful in the practice of the present invention include: alkyl diols from $C_2$ to $C_{12}$, such as ethylene glycol, diethylene glycol, butanediol, propanediol, hexanediol, and the like; cycloaliphatic diols, such as cyclohexanedimethanol and the like; aliphatic diols containing aromatic moieties; and polymeric and/or oligomeric alkyleneoxide polyols with alkyl chain length from $C_2$ to $C_{12}$ (linear or branched) with a number average molecular weight from about 300 to 5000. One preferred polyalkyleneoxide is polytetramethylene glycol (Terethane®). Particularly preferred difunctional alcohols are ethylene glycol and butanediol.

Difunctional carboxylic acids useful in the practice of the present invention generally have the following formula shown in Formula 2:

Formula 2

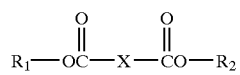

wherein $R_1$ and $R_2$ each represent a hydrogen atom or a $C_1$ to $C_6$ alkyl moiety and X is an aliphatic, cycloaliphatic and/or aromatic moiety containing from 2 to 34 carbon atoms.

Some examples of difunctional carboxylic acids useful in the practice of the present invention include: aliphatic diacids from $C_4$ to $C_{36}$ such as adipic acid, azelaic acid, sebacic acid; cycloaliphatic diacids, such as cyclohexane dicarboxylic acid and the like; aromatic diacids, such as terephthalic acid, naphthalene dicarboxylic acid, isophthalic acid, and the like; and the lower ($C_1$ to $C_6$) alkyl esters of said dicarboxylic acids. Particularly preferred difunctional carboxylic acids are terephthalic acid, sebacic acid and isophthalic acid.

Preferably the total mole ratio of difunctional alcohols to difunctional carboxylic acids added to the reaction is at least 1:1, more preferably, about 1–1.8:1, and even more preferably, about 1.5–2:1 of alcohol to acid.

Optional polyfunctional branching agents useful in the practice of the present invention may include those conventionally used, such as: trimellitic dianhydride, pyromellitic anhydride, trimethylolethane, trimethylolpropane and pentaerythritol. Up to about 3% of the polyfunctional branching agents may be added. Preferably, less than 2% of polyfunctional branching agents is added. More preferably, less than 1% of polyfunctional branching agents is added.

Examples of low polarity blocks useful in the practice of the present invention include: saturated and unsaturated linear and/or branched telechelic polyolefins from $C_2$ to $C_{18}$ with terminal functional groups, such as hydroxyl, carboxyl, anhydride, acid chloride, oxirane and the like, with a weight average molecular weight from about 500 to 4500, more preferably, about 1000 to about 4000, most preferably, about 1800 to about 3500; ABA telechelic block copolymers where B is alkyl and/or aromatic substituted polysiloxanes with a weight average molecular weight from about 1000 to 10,000, preferably, about 1500 to about 6000, more preferably, about 1800 to about 3500, and where A is a functionally terminated polyalkyleneoxide (ether) with an alkyl chain length of $C_2$ to $C_6$; or fluorine substituted telechelic oligomers and polymers, such as polyesters, acrylics, polyurethanes, polyolefins, polycarbonates, epoxies (epichlorohydrin-bis-phenol and Novolac® type polymers), and the like. The above-mentioned polyolefins may include, for example: ethylene, propylene, butylene, isobutylene, other alkyl substituted olefins, c-olefins, and any copolymer combinations of these alkyl monomers.

Low polarity block segments that are particularly useful in the practice of the present invention are polymeric and oligomeric olefins and siloxanes, and have the general formulas shown in Formula 3 and 4:

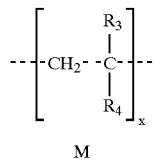

Formula 3 where M is one or a combination of monomer structures; $R_3$ and $R_4$ are H and/or any combination of $C_1$ to $C_{16}$ linear or branched aliphatic, cycloaliphatic, or aromatic hydrocarbon; and x is the degree of polymerization, preferably, x is 10 to 160, more preferably, 20 to 110, and most preferably, 28 to 80.

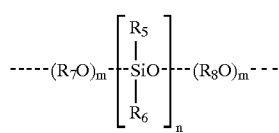

Formula 4 wherein m may range from 1 to 70, more preferably m ranges from 1 to 10; n may range from 5 to 120, more preferably n ranges from 10 to 30; and wherein $R_5$, $R_6$, $R_7$ and $R_8$ are $C_1$ to $C_{12}$ aliphatic, aromatic linear or branched hydrocarbons.

One preferred polyolefin material useful in the practice of the present invention is Kraton L-2203, which is a hydroxyl terminated butylene/ethylene copolymer comprising about 50 wt % butylene and about 50 wt % ethylene, and having an average MW of about 3,000. One preferred hydroxyl terminated polysiloxane material is CoatOSil 2812, which comprises about 40 wt % polyalkyleneoxide and about 60 wt % polydimethylsiloxane. More specifically, the CoatOSil 2812 comprises about 40 wt % of a 350 molecular weight ethyleneoxide tipped polypropyleneoxide block (A) and about 60 wt % of a 2000 molecular weight polydimethylsiloxane block (B).

Thus, in accordance with the present invention, a particularly preferred copolymer composition comprises the reaction product of: (1) ethylene glycol and/or butanediol, (2) terephthalic acid and/or sebacic acid and/or isophthalic acid and (3) a polyolefin and/or polysiloxane composition, such as Kraton L-2203 and CoatOSil 2812. Optionally, one or more polyfunctional branching agents, such as those set out above, may be added to the reaction.

One preferable polysiloxane block segment is a hydroxyl terminated polyalkyleneoxide block polydimethylsiloxane, shown below in Formula 5:

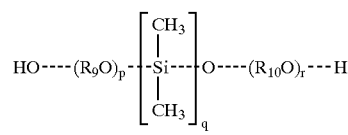

Formula 5

Wherein $R_9$ and $R_{10}$ may be linear or branched alkyl groups with preferably $R_9$ and $R_{10}$ being the same; q may range from 5 to 35, preferably, q ranges from 10 to 30, and more preferably, q ranges from 15 to 25; and wherein both r and p may range from 2 to 20, and preferably, r equals p.

Another preferred low polarity oligomeric segment is formed from ethylene and/or one or more α-olefins, such as propylene, butylene and other α-olefins. This structure is shown below in Formula 6:

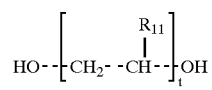

Formula 6 where M is one or more monomer structures; $R_{11}$ is H and/or any combination of $C_1$ to $C_{16}$ linear or branched aliphatic, cycloaliphatic, aromatic hydrocarbon; and t is the degree of polymerization, preferably, t is 10 to 160, more preferably, 20 to 110, and most preferably, 28 to 80.

The thus-formed copolyesters of the present invention, having the incorporated low polarity block, preferably have a weight average molecular weight of from about 5,000 to about 150,000. More preferably, the copolyesters, having the incorporated low polarity block, have a weight average molecular weight of from about 10,000 to about 100,000. Most preferably, the copolyesters, having the incorporated low polarity block, have a weight average molecular weight of from about 30,000 to about 90,000.

The low polarity blocks are preferably incorporated into the backbone of the copolyesters at levels of from about 0.5 to about 85 weight percent. More preferably, these low polarity blocks are incorporated into the backbone of the copolyesters at levels of from about 1 to about 50 weight percent. More preferably, these low polarity blocks are incorporated into the backbone of the copolyesters at levels of from about 2 to about 35 weight percent.

The resulting block copolyesters show a significant improvement in aged adhesion to various substrates such as: untreated polyethyleneterephthalate (PET), polyethylenenaphthalate (PEN), untreated oriented polypropylene (OPP), polyvinyl fluoride (Tedlar®), nylons, polyimides, polycarbonates, polystyrene, polymethylmethacrylate (PMMA), polyvinyldiene fluoride (Kynar®), polyurethanes, and cellulosics. The most startling results were observed with adhesion of these polymers to untreated PET, where copolyesters which do not contain these low polarity blocks do not have the equivalent initial adhesion and do not maintain their initial level of adhesion after crystallization. It has been found that these polymers are particularly useful as tie-layers with similar and/or dissimilar substrates such as: PET, PEN, polyolefins, vinyl-type polymers (Tedlar®, Kynar®, PVC), and the like. These block copolyesters are further useful as powder, web, and film adhesives for textile and film applications; solvent solutions useful as coatings as well as adhesives for film lamination, hot melt applied adhesives; and coextruded melt bonded films.

The compositions of the present invention will be further illustrated with reference to the following Examples which are intended to aid in the understanding of the present invention, but which are not to be construed as a limitation thereof.

EXAMPLE 1

Control "a"

A mixture of 991.16 g butanediol (100 mole % of the difunctional alcohol), 446.61 g (44 mole % of the dicarboxylic acid) terephthahic acid, 691.97 g (56 mole % of the dicarboxylic acid) sebacic acid (glycol/acid mole ratio charged=1.8/1), and 0.44 g Tyzor DEA was added to a 2 L resin flask which was fitted with a 4 necked, flanged, reactor head. The reactor head was equipped with a stirrer in the center neck, a gas inlet, a thermocouple, and a side arm fitted with a fractionating column mounted with a variable takeoff head. The reaction mixture was heated at 235° C. under inert atmosphere conditions until the distillation of water slowed and the top-of-column vapor temperature fell to below 85° C. (approximately 5 hrs.). Approximately 220 g of water was collected in the receiver. The fractionating column and variable takeoff head was then removed, a condenser fitted with a receiver and a vacuum adapter and cold-trap was added. An additional 0.44 g Tyzor DEA added to the reaction mixture. The temperature was increased to 240° C. and the pressure reduced to 0.3 millimeters of mercury to remove the remaining water followed by the excess glycol. The polyesterification reaction was continued until a drop-point based on intrinsic viscosity was reached (polymer yield: 68.99%).

Control "b"

To the identical reaction apparatus that was employed in Example 1 was added 777.48 g ethylene glycol (100 mole % of the difunctional alcohol), 549.17 g (47.5 mole % of the dicarboxylic acid) terephthalic acid, 738.86 g (52.5 mole % of the dicarboxylic acid) sebacic acid, and 0.738 g antimony acetate (diol/diacid mole ratio charged=1.8/1). The reaction mixture was heated to 235° C. under inert atmosphere conditions until the distillation of water slowed and the top-of-column temperature fell to below 85° C. (approximately 5 hrs.). Approximately 263 g of water was collected in the receiver. The fractionating column and variable takeoff head was then removed, and condenser fitted with a receiver and a vacuum adapter and cold-trap was added. An additional 0.738 g antimony acetate added to the reaction mixture.

The temperature was increased to 240° C. and the pressure reduced to 0.3 millimeters of mercury. The polyesterification reaction was continued until a drop-point based on intrinsic viscosity was reached (polymer yield: 71.14%).

Control "c"

To the identical reaction apparatus that was employed in Example 1 was added 732.3 g butanediol (100 mole % of the difunctional alcohol), 553.22 g (50 mole % of the dicarboxylic acid) terephthalic acid, 553.22 g (50 mole % of the dicarboxylic acid) isophthalic acid (diol/diacid mole ratio charged=1.8/1), and 1.5 g Fascat 9100. The reaction mixture was heated to 235° C. under inert atmosphere conditions until the distillation of water slowed and the top-of-column temperature fell to below 85° C. (approximately 5 hrs.). Approximately 239.95 g of water was collected in the receiver. The fractionating column and variable takeoff head was then removed, a condenser fitted with a receiver and a vacuum adapter and cold-trap was added. The temperature was increased to 240° C. and the pressure reduced to 0.3 millimeters of mercury. The polycondensation reaction was continued until a drop-point based on intrinsic viscosity was reached (polymer yield: 79.80%).

EXAMPLE 2

To each of the above controls, the appropriate amount of low polarity telechelic oligomeric block material was added at the beginning of the reaction (direct esterification stage) to obtain the copolyester compositions in Table 1.

EXAMPLE 3—TESTING PROCEDURES 7 g of ground resin was placed between two 8½"×11" facer sheets and pressed on a 30 ton Carver, automatic press at 350° F. Lower temperatures were used when facers with lower distortion temperatures were utilized. The sample was held at a pressure of 20 tons for a 10 minute heating cycle and then a 10 minute cooling cycle. The sample was immediately removed from the press, cut into 1" strips, and the initial adhesion measured at a 180° peel angle, on a Theller Model D mini tensile tester. Another sample prepared in an identical manner was tested after 3 days of aging at ambient conditions. Results reported in Table 2 represent an average of adhesion measured from 5 test strips cut from the same sample and are reported in pounds per linear inch (pli).

Ring and ball softening point samples were annealed at 45° C. for 24 hours and then tested according to ASTM E 28.

TABLE 1

| | COPOLYESTER COMPOSITIONS | | | | | | |
|---|---|---|---|---|---|---|---|
| | Difunctional Alcohol | | Difunctional Carboxylic Acid | | | Low Polarity Block | |
| Example No. | Mole % Butanediol | Mole % Ethylene glycol | Mole % Sebacic Acid | Mole % Terephthalic Acid | Mole % Isophthalic Acid | Weight %* Polyolefin | Weight %* Polysiloxane |
| 1a (Control) | 100 | | 56 | 44 | | 0 | 0 |
| 2a | 100 | | 56 | 44 | | 2.5 | |
| 3a | 100 | | 56 | 44 | | 5 | |

TABLE 1-continued

COPOLYESTER COMPOSITIONS

| | Difunctional Alcohol | | Difunctional Carboxylic Acid | | | Low Polarity Block | |
|---|---|---|---|---|---|---|---|
| Example No. | Mole % Butanediol | Mole % Ethylene glycol | Mole % Sebacic Acid | Mole % Terephthalic Acid | Mole % Isophthalic Acid | Weight %* Polyolefin | Weight %* Polysiloxane |
| 4a | 100 | | 56 | 44 | | 10 | |
| 5a | 100 | | 56 | 44 | | 20 | |
| 6a | 100 | | 56 | 44 | | 30 | |
| 7a | 100 | | 56 | 44 | | | 8.33 |
| 1b (Control) | | 100 | 46 | 54 | | 0 | 0 |
| 2b | | 100 | 46 | 54 | | 2.5 | |
| 3b | | 100 | 46 | 54 | | 5 | |
| 4b | | 100 | 46 | 54 | | 10 | |
| 5b | | 100 | 46 | 54 | | 20 | |
| 6b | | 100 | 46 | 54 | | 30 | |
| 7b | | 100 | 46 | 54 | | | 8.33 |
| 1c (Control) | 100 | | | 50 | 50 | 0 | 0 |
| 2c | 100 | | | 50 | 50 | 2 | |
| 3c | 100 | | | 50 | 50 | 5 | |
| 4c | 100 | | | 50 | 50 | 10 | |
| 5c | 100 | | | 50 | 50 | | 3.33 |
| 6c | 100 | | | 50 | 50 | | 6.67 |

*Weight % based on polymer yield

TABLE 2

TEST RESULTS

| Facer Type Example No. | Ring & Ball Softening point ° C. | Intrinsic Viscosity (g/dl) | Untreated PET[2] Initial (pli)[1] | Untreated PET[2] Aged (pli)[1] | Untreated OPP[3] Initial (pli)[1] | Untreated OPP[3] Aged (pli)[1] |
|---|---|---|---|---|---|---|
| 1a (Control) | 123–128 | 0.920 | 5.60 | 2.64 | 0 | 0 |
| 2a | 116–123 | 0.899 | 12.22 | 11.73 | 0 | 0 |
| 3a | 114–123 | 0.852 | 14.93 | 14.22 | 0.12 | 0 |
| 4a | 117–127 | 0.867 | 13.92 | 13.69 | 1.14 | 0.08 |
| 5a | 117–127 | 0.794 | 15.00 | 12.78 | 1.86 | 0.39 |
| 6a | 120–144 | 0.797 | 15.13 | 14.92 | 2.22 | 2.08 |
| 7a | 112–114 | * | 13.29 | 12.26 | 0 | 0 |
| 1b (Control) | 123–131 | 0.935 | 13.69 | 1.22 | 0 | 0 |
| 2b | 144–152 | 0.705 | 2.63 | 2.37 | 0.85 | 0.37 |
| 3b | 143–148 | 0.717 | 2.63 | 2.32 | 0.75 | 2.20 |
| 4b | 143–149 | 0.636 | 15.47 | 1.40 | 1.09 | 1.83 |
| 5b | 136–142 | 0.587 | 11.85 | 1.68 | 2.17 | 1.32 |
| 6b | 133–141 | 0.597 | 14.68 | 1.78 | 2.16 | 1.93 |
| 7b | 133–143 | * | 7.18 | 3.50 | — | — |
| 1c (Control) | 133–142 | 0.650 | 0.11 | 0.11 | — | — |
| 2c | 133–141 | 0.740 | S.R. | S.R. | — | — |
| 3c | 132–142 | 0.651 | S.R. | S.R. | — | — |
| 4c | 131–142 | 0.626 | S.R. | S.R. | — | — |
| 5c | 134–140 | * | S.R. | S.R. | — | — |
| 6c | 133–137 | * | S.R. | S.R. | — | — |

[1]pli = pounds per linear inch
[2]PET = polyethyleneterephthalate
[3]OPP = oriented polypropylene
[4]MFI = melt flow index
[5]S.R.= Substrate rippage (maximum adhesion)
*The intrinsic viscosity could not be run because the polymer was not fully soluble in the testing solution

TABLE 3

Untreated PET Adhesion Results

| Facer Type Example No. | Untreated PET[2] Initial (pli)[1] | Untreated PET[2] Aged (pli)[1] | Loss of Adhesion (pli)[1] | Loss of Adhesion (%) | Initial Adhesion Compared to Control (%)/(+, −) | Aged Adhesion Compared to Control (%)/(+, −) |
|---|---|---|---|---|---|---|
| 1a (Control) | 5.60 | 2.64 | 2.96 | 52.9 | | |
| 2a | 12.22 | 11.73 | 0.49 | 4.0 | 218 | 444 |
| 3a | 14.93 | 14.22 | 0.71 | 4.8 | 267 | 539 |
| 4a | 13.92 | 13.69 | 0.23 | 1.6 | 249 | 519 |
| 5a | 15.00 | 12.78 | 2.22 | 14.8 | 268 | 484 |
| 6a | 15.13 | 14.92 | 0.21 | 1.4 | 270 | 565 |
| 7a | 13.29 | 12.26 | 1.03 | 7.8 | 237 | 464 |
| 1b (Control) | 13.69 | 1.22 | 12.47 | 91 | | |
| 2b | 2.63 | 2.37 | 0.26 | 9.9 | 19 | 194 |
| 3b | 2.63 | 2.32 | 0.31 | 11.8 | 19 | 190 |
| 4b | 15.47 | 1.4 | 14.07 | 91.0 | 113 | 115 |
| 5b | 11.85 | 1.68 | 10.17 | 85.8 | 87 | 138 |
| 6b | 14.68 | 1.78 | 12.90 | 87.9 | 107 | 146 |
| 7b | 7.18 | 3.5 | 3.68 | 51.2 | 52 | 287 |
| 1c (Control) | 0.11 | 0.11 | 0 | 0 | | |
| 2c | S.R. | S.R. | 0 | 0 | + | + |
| 3c | S.R. | S.R. | 0 | 0 | + | + |
| 4c | S.R. | S.R. | 0 | 0 | + | + |
| 5c | S.R. | S.R. | 0 | 0 | + | + |
| 6c | S.R. | S.R. | 0 | 0 | + | + |

[1]pli = pounds per linear inch
[2]PET = polyethyleneterephthalate
[3]OPP = oriented polypropylene
[4]MPI = melt flow index
[5]S.R. = Substrate rippage (maximum adhesion)

TABLE 3

Untreated OPP Adhesion Results

| Facer Type Example No. | Untreated PET[2] Initial (pli)[1] | Untreated PET[2] Aged (pli)[1] | Loss of Adhesion (pli)[1] | Loss of Adhesion (%) | Initial Adhesion Compared to Control (%)/(+, −) | Aged Adhesion Compared to Control (%)/(+, −) |
|---|---|---|---|---|---|---|
| 1a (Control) | 0 | 0 | NA[6] | NA[6] | | |
| 2a | 0 | 0 | NA[6] | NA[6] | same | same |
| 3a | 0.12 | 0 | 0.12 | 100 | + | + |
| 4a | 1.14 | 0.08 | 1.07 | 94 | + | + |
| 5a | 1.86 | 0.39 | 1.48 | 80 | + | + |
| 6a | 2.22 | 2.08 | 0.15 | 6 | + | + |
| 7a | 0 | 0 | NA[6] | NA[6] | same | same |
| 1b (Control) | 0 | 0 | NA[6] | NA[6] | | |
| 2b | 0.85 | 0.37 | 0.48 | 56 | + | + |
| 3b | 0.75 | 2.2 | increase | increase | + | + |
| 4b | 1.09 | 1.83 | increase | increase | + | + |
| 5b | 2.17 | 1.32 | 0.85 | 39 | + | + |
| 6b | 2.16 | 1.93 | 0.23 | 11 | + | + |

[1]pli = pounds per linear inch
[2]PET = polyethyleneterephthalate
[3]OPP = oriented polypropylene
[4]MPI = melt flow index
[5]S.R. = Substrate rippage (maximum adhesion)
[6]NA = not applicable As demonstrated, the copolyester compositions of the present invention exhibit improved initial adhesion, improved aged adhesion and/or reduced loss of adhesion over time.

Although preferred embodiments of the invention have been described using specific terms, such description is for illustrative purposes only, and it is to be understood that changes and variations may be made without departing from the spirit or scope of the following claims.

What is claimed:

1. A method of making an adhesive or coating, comprising:

reacting at least one difunctional alcohol and at least one dicarboxylic acid to form a copolyester polymer chain, and during the course of that reaction, infusing at least one low polarity polymeric block into the copolyester polymer chain wherein at least one low polarity polymeric block is selected from the group of: saturated and unsaturated telechelic polyolefins having a weight average molecular weight of between 500 and 4500, fluorine substituted telechelic oligomers and polymers, functionally terminated ABA block copolymers of polyalkyleneoxide (A) and alkyl and aromatic substituted polysiloxanes (B), and blends thereof.

2. The method of claim 1, wherein the reaction is carried out in two stages, the first stage being a direct esterification or transesterification reaction, and the second stage being a polyesterification stage, and wherein the low polarity polymeric block is infused during the first stage.

3. The method of claim 2 further comprising adding at least one catalyst during the first stage.

4. The method of claim 3, whereby the at least one catalyst is an esterification catalyst selected from the group of: acid salts, hydroxides of potassium and lithium, para-toluenesulfonic acid (p-TSA), lead and tin salts, mineral acids and blends thereof.

5. The method of claim 3, whereby the at least one catalyst is a transesterification catalyst selected from the group of: alkyl titanates, alkyl tin compounds, acetates of antimony, zinc, manganese, magnesium, calcium and blends thereof.

6. The method of claim 2 further comprising adding at least one catalyst during the second stage.

7. The method of claim 6, whereby the at least one catalyst is selected from the group of: oxides of lead, oxides of manganese, oxides of germanium, alkyl titanates, alkanolamine complexes of titanium, organotin compounds and blends thereof.

8. The method of claim 1, whereby the adhesive or coating has substantial adhesion to polymeric or cellulosic substrates.

9. The method of claim 8, whereby the substantial adhesion is initial adhesion.

10. The method of claim 9, whereby the substantial adhesion is initial adhesion to low surface energy substrates.

11. The method of claim 8, whereby the substantial adhesion is aged adhesion.

12. The method of claim 11, whereby the substantial adhesion is aged adhesion to low surface energy substrates.

13. The method of claim 1, wherein the adhesive or coating is solvent based.

14. The method of claim 1, wherein the at least one difunctional alcohol is selected from the group of: alkyl diols from $C_2$ to $C_{12}$, cycloaliphatic diols, aliphatic diols containing aromatic moieties, $C_2$–$C_{12}$ polyalkyleneoxide polyols, and blends thereof.

15. The method of claim 14, wherein the at least one difunctional alcohol is selected form the group of: ethylene glycol, diethylene glycol, butanediol, propanediol, hexane diol, cyclohexanedimethanol, oligomeric alkylencoxide polyols with a number average molecular weight from about 300 to about 5000, and blends thereof.

16. The method of claim 15, wherein the at least one difunctional alcohol is selected from the group of: ethylene glycol, butanediol, and blends thereof.

17. The method of claim 1, wherein the at least one dicarboxylic acid is selected from the group of: aliphatic diacids from $C_4$ to $C_{36}$, cycloaliphatic diacids, aromatic diacids, their $C_1$ to $C_6$ alkyl esters of dicarboxylic acids, and blends thereof.

18. The method of claim 17, wherein the at least one dicarboxylic acid is selected from the group of: aliphatic diacids from $C_4$ to $C_{36}$ such as adipic acid, azelaic acid, sebacic acid, cyclohexane dicarboxylic acid, or aromatic diacids such as terephthalic acid, naphthalene dicarboxylic acid, isophthalic acid, the lower ($C_1$ to $C_6$) alkyl esters of said dicarboxylic acids, and blends thereof.

19. The method of claim 18, wherein the at least one dicarboxylic acid is selected from the group of: terephthalic acid, sebacic acid, isophthalic acid or their methyl esters, or blends thereof.

20. The method of claim 18, wherein the at least one dicarboxylic acid is selected from the group consisting of adipic acid, azelaic acid, sebacic acid, cyclohexane dicarboxylic acid, terephthalic acid, naphthalene dicarboxylic acid, isophthalic acid, the lower ($C_1$ to $C_6$) alkyl esters of said dicarboxylic acids, and blends thereof.

21. The method of claim 1, wherein the at least one low polarity polymeric block is selected from the group of: saturated and unsaturated telechelic polyolefins, fluorine substituted telechelic oligomers and polymers, functionally terminated ABA block copolymers of polyalkyleneoxide (A) and alkyl and aromatic substituted polysiloxanes (B), and blends thereof.

22. The method of claim 21, wherein the at least one low polarity polymeric block is selected from: ABA telechelic block copolymers of polyalkyleneoxide (A) and alkyl and aromatic substituted polysiloxanes (B) with a weight average molecular weight from about 1000 to about 10,000.

23. The method of claim 22, wherein the at least one low polarity polymeric block is selected from: ABA telechelic block copolymers with a weight average molecular weight from about 1500 to about 6000.

24. The method of claim 23, wherein the at least one low polarity polymeric block is selected from: ABA telechelic block copolymers with a weight average molecular weight from about 1800 to about 3500.

25. The method of claim 1, wherein the at least one low polarity polymeric block is an ABA block polymer consisting of about 40 wt % polyalkylencoxide and about 60 wt % polydimethylsiloxane.

26. The method of claim 1 further comprising adding at least one polyfunctional branching agent during the first stage.

27. The method of claim 26, wherein the at least one polyfunctional branching agent is selected from the group of trimellitic anhydride, pyromellitic dianhydride, trimethylolethane, trimethylolpropane, pentaerythritol and blends thereof.

28. The method of claim 1, wherein the adhesive or coating has a weight average molecular weight of about 5,000 to about 150,000.

29. The method of claim 1, wherein the adhesive or coating has a weight average molecular weight of about 30,000 to about 90,000.

30. The method of claim 1, wherein the adhesive or coating has substantial aged adhesion to a substrate selected from the group consisting of untreated polyethyleneterephthalate (PET), polyethylenenaphthalate (PEN), untreated oriented polypropylene (OPP), polyvinyl fluoride, nylons, polyimides, polycarbonates, polystyrene, polymethylmethacrylate (PMMA), polyvinyldiene fluoride, polyurethanes, and cellulosics.

31. A method of improving the adhesion of copolyesters to polymeric or cellulosic substrates, comprising:

incorporating a low polarity telechelic oligomeric block segment in the copolyester polymer chain wherein the copolyester polymer is prepared from at least one difunctional alcohol and at least one dicarboxylic acid; and the low polarity telechelic oligomeric block segment is selected from the group of: saturated and unsaturated telechelic polyolefins having a weight average molecular weight of between 500 and 4500, fluorine substituted telechelic oligomers and polymers, functionally terminated ABA block copolymers of polyalkyleneoxide (A) and alkyl and aromatic substituted polysiloxanes (B), and blends thereof.

32. The method of claim 31, wherein the improved adhesion is initial adhesion.

33. The method of claim 32, wherein the improved adhesion is initial adhesion to low surface energy substrates.

34. The method of claim 31, wherein the improved adhesion is aged adhesion.

35. The method of claim 34, wherein the improved adhesion is aged adhesion to low surface energy substrate.

36. The method of claim 31, wherein the copolyester is a crystalline copolyester.

37. The method of claim 31, wherein the low polarity block segment is incorporated into the copolyester polymer chain at levels of from about 0.5 to about 85 weight percent.

38. The method of claim 37, wherein the low polarity block segment is incorporated into the copolyester polymer chain at levels of from about 1 to about 50 weight percent.

39. The method of claim 38, wherein the low polarity block segment is incorporated into the copolyester polymer chain at levels of from about 2 to about 35 weight percent.

40. An adhesive or coating copolyester composition having substantial adhesion to polymeric substrates, comprising the reaction product of:

at least one difunctional alcohol;

at least one dicarboxylic acid; and at least one low polarity telechelic oligomeric block material wherein at least one low polarity block is selected from the group of: saturated and unsaturated telechelic polyolefins having a weight average molecular weight of between 500 and 4500; fluorine substituted telechelic oligomers and polymers; functionally terminated ABA block copolymers of (A) polyalkyleneoxide and (B) alkyl or aromatic substituted polysiloxanes; and blends thereof.

41. The adhesive or coating composition of claim 40, wherein the composition has substantial retained adhesion to polymeric and low surface energy substrates.

42. The adhesive or coating composition of claim 40, wherein the at least one difunctional alcohol is selected from the group of: alkyl diols from $C_2$ to $C_{12}$, cycloaliphatic diols, aliphatic diols containing aromatic moieties, $C_2$–$C_{12}$ polyalkylencoxide polyols, and blends thereof.

43. The adhesive or coating composition of claim 40, wherein the at least one dicarboxylic acid is selected from the group of: aliphatic diacids from $C_4$ to $C_{36}$, cycloaliphatic diacids, aromatic diacids, and blends thereof.

44. The adhesive or coating composition of claim 40 further comprising at least one polyfunctional branching agent.

45. The adhesive or coating composition of claim 40, wherein the at least one low polarity polymeric block is an ABA block polymer consisting of about 40 wt % polyalkylencoxide and about 60 wt % polydimethylsiloxane.

46. The adhesive or coating composition of claim 40, wherein the adhesive or coating composition has a weight average molecular weight of about 5,000 to about 150,000.

47. The adhesive or coating of claim 40, wherein the composition has substantial retained adhesion to substrates comprising at least one material selected from untreated polyethyleneterephthalate, polyethylenenaphthalate, untreated oriented polypropylene, polyvinyl fluoride, nylon, polyimide, polycarbonate, polystyrene, polymethyl methacrylate, polyvinyldiene fluoride, polyurethanes, and cellulosics.

\* \* \* \* \*